United States Patent [19]

Barnard

[11] Patent Number: 5,565,983
[45] Date of Patent: Oct. 15, 1996

[54] OPTICAL SPECTROMETER FOR DETECTING SPECTRA IN SEPARATE RANGES

[75] Inventor: Thomas W. Barnard, Weston, Conn.

[73] Assignee: The Perkin-Elmer Corporation, Norwalk, Conn.

[21] Appl. No.: 451,351

[22] Filed: May 26, 1995

[51] Int. Cl.⁶ ........................ G01J 3/18
[52] U.S. Cl. ........................ 356/328
[58] Field of Search ............... 356/305, 326, 356/328, 334

[56] References Cited

U.S. PATENT DOCUMENTS

| | | | |
|---|---|---|---|
| 3,521,943 | 7/1970 | Kelderman | 359/572 |
| 3,523,734 | 8/1970 | Brehm et al. | 356/328 |
| 3,791,737 | 2/1974 | Johansson | 356/328 |
| 4,766,287 | 8/1988 | Morrisroe et al. | 219/121.52 |
| 4,820,048 | 4/1989 | Barnard | 356/328 |

*Primary Examiner*—F. L. Evans
*Attorney, Agent, or Firm*—Edwin T. Grimes; Herbert S. Ingham

[57] ABSTRACT

A spectrometer includes a pair of crossed reflective gratings to effect a spectrally dispersed beam that is focussed to an array detector. The second grating is a plural grating with a surface formed of a first portion and a second portion. The first portion has a groove density for effecting ultraviolet in the dispersed beam. The second portion has a groove density for effecting visible radiation in the dispersed beam. A shutter blocks or exposes the second portion of the grating surface so as to select the first spectral range or the second spectral range for detection. The plural grating surface preferably may be contoured to compensate for aberrations in focussing of the beam to the detector. A computer may be used for selecting spectral lines for analysis, particularly selecting such lines in the second range that are not interfered with by the first range.

14 Claims, 2 Drawing Sheets

OPTICAL SPECTROMETER FOR DETECTING SPECTRA IN SEPARATE RANGES

This invention relates to optical spectrometers and particularly to optical spectrometers for separate detection of different spectral ranges.

BACKGROUND

Optical spectrometers are instruments that disperse light radiation into spectral patterns for analysis. Such instruments are used for various purposes, for example to effect and analyze spectral lines characteristic of the atomic elements in a sample. For an accurate quantitative analysis or detection of minute quantities of elements, the spectrometer must have a high degree of precision.

One type of spectrometer used for analysis of inorganic samples is an atomic emission spectrometer that utilizes an induction coupled plasma ("ICP") source of light radiation. A nebulized sample material is injected into the plasma where it becomes disassociated into atoms which are excited in the plasma so as to emit radiation including the spectral lines. An example of such an induction plasma system is disclosed in U.S. Pat. No. 4,766,287 (Morrisroe et al).

A polychromator in a spectrometer disperses the radiation into a band or multiplicity of wavelengths or spectral lines that are detected. An example of a precision polychromator is an echelle system with tandem, crossed dispersion units to produce a two-dimensional display of spectral lines as disclosed in U.S. Pat. No. 4,820,048 (Barnard) of the present assignee. The spectral lines are focussed onto a detector consisting of a two dimensional solid state charge transfer device that produces signals proportional to the intensity of the corresponding lines. A computer processes the signal information, corrects for background, applies calibration, and displays the results in the form of concentrations of atomic elements in the sample.

As illustrated in the aforementioned U.S. Pat. No. 4,820,048, a crossed disperser type of spectrometer may be configured to detect in several spectral ranges, particularly visible and ultraviolet light ranges. The first dispersion element, a diffraction grating, is common for both ranges. For the ultraviolet range, a second grating, having grating lines perpendicular to those of the first, reflects and further disperses the radiation which is focussed to a first detector. For the visible range, the second grating has a central hole herein, and radiation passing through the hole is collected and cross dispersed by a prism and focussed to a second detector. Both detectors are two dimensional types, and signals therefrom are led to the common processing unit. Thus this type of spectrometer, although having high precision for two spectral ranges, entails the expense, complexity and bulkiness of two separate optical trains including dispersers and detectors for the second of the crossed dispersion units. The two ranges need to be detected separately because they otherwise are too widely spread spatially by the dispersers for convenient detection by a single detector.

Components in optical systems can introduce aberrations that distort images. In the case of the above-described spectrometer, a spherical mirror that focusses the radiation from the second grating to the detector creates inherent geometric aberrations in the focussing of the image of the inlet slit of the system. The predominant type is known as spherical aberration that results in focussing of off-axis rays into a slightly different plane than the rays near the rotational axis. This may be corrected by replacing the spherical mirror with a parabolic mirror. However, such mirrors are costly and generally limited to a small field of view which is inefficient in echelle spectrometers.

Another means for correcting for spherical aberration is a Schmidt element. In one form a refracting plate of glass or plastic having a thickness that varies with radius is inserted in the beam. Another type utilizes an additional reflector with a curvature that provides the correction. In either of these cases, the corrector introduces an extra element into the system, with attendant radiation losses, background increases and added bulkiness, complexity and cost. In a third case, as indicated in the aforementioned U.S. Pat. No. 4,820,048, the second grating may be provided with a non-planar surface to function as the Schmidt corrector. Such a corrector grating is disclosed in U.S. Pat. No. 3,521,943 (Kelderman).

An object of the invention is to provide an improved optical spectrometer for detecting spectra in separate spectral ranges. A particular object is to provide a spectrometer having a novel means for effecting spectra in separate spectral ranges. A further object is to provide such a spectrometer having crossed dispersion elements in which the second element allows for selective detection of spectra in the separate spectral ranges. Another object is to provide crossed-disperser spectrometer having a single optical train for detecting spectra in separate spectral ranges. Yet another object is to provide such a spectrometer having for the second dispersion element a grating that corrects for aberrations.

SUMMARY

The foregoing and other objects are achieved, at least in part, in an optical spectrometer for separately detecting different spectral ranges. The spectrometer includes a spectral dispersion means receptive of light radiation to effect a spectrally dispersed beam, and a detector receptive of the dispersed beam for detection thereof. The dispersion means comprises a plural grating, preferably reflective, having a grating surface formed of a first portion and a second portion. The first portion has a first groove configuration for effecting the dispersed beam in a first spectral range such as ultraviolet. The second portion has a second groove configuration for effecting the dispersed beam in a second spectral range, such as visible, different than the first spectral range. Advantageously the dispersion means further comprises a selection means, advantageously a shutter, for selectively blocking the first portion or the second portion of the grating surface so as to select the first spectral range or the second spectral range for detection.

In a preferred aspect, the spectrometer further includes an initial dispersion means, advantageously a reflective grating, that is receptive of source radiation to effect the light radiation in the form of an initial spectrum. The plural grating is crossed with this initial dispersion means to effect the dispersed beam. A two dimensional array of photodetectors is receptive of the beam.

The spectrometer additionally may include a focussing means such as a concave mirror for focussing the dispersed beam to the detection means, wherein the focussing means introduces an inherent aberration into the focussing of the dispersed beam. In such case, the surface of the plural grating preferably is contoured to substantially compensate for the aberration.

DETAILED DESCRIPTION

Figure 1:
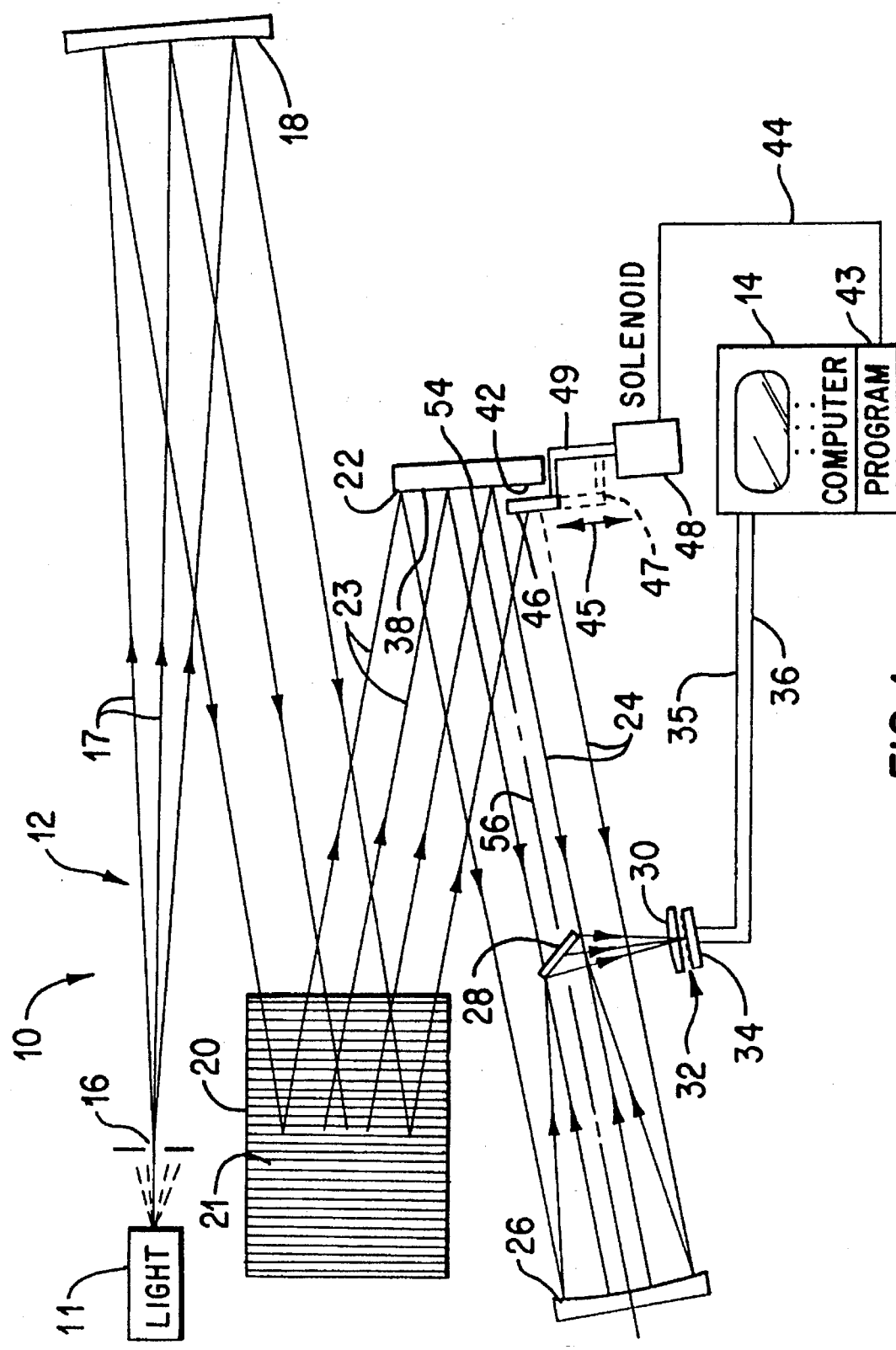
FIG. 1 is a schematic drawing of an optical spectrographic system including a cross section of an optical spectrometer incorporating the present invention.

With reference to FIG. 1 there are, broadly, three sections of an optical spectrographic system 10 of the invention; namely, a source of light radiation 11, an optical spectrometer 12, and a data processing station 14. The radiation source produces infrared, visible and/or ultraviolet radiation. The source may be, for example, an inductively coupled plasma into which a sample of test material is injected, or a graphite furnace or the like. In either case the source operates to provide emission lines or absorption lines of atomic elements. Other light sources may be used, for example the light may collected through an astronomical telescope.

In the spectrometer section, the light from the source passes through an entrance slit 16, and rays 17 are reflected by a concave collimator mirror 18 to a reflective echelle dispersion grating 20. This flat grating has a relatively low density of sawtooth-shaped grooves 21 with a high blaze angle, and is of the known or desired type. The grating has, for example, 790 grooves per centimeter, is blazed at 63° and produces high order spectra. "High order spectra" herein means at least two orders are produced and that these are higher than first order. Preferably orders 30 to 120 are utilized inclusively. Although a reflective grating is preferred, particularly as it is able to pass and disperse ultraviolet light, other embodiments may utilize other means for the first diffraction such as a pass-through grating. In any case, this first dispersion means effects light radiation in the form of an initial spectrum 23.

The initial spectrum is directed to a second echelle grating 22 with dispersion lines oriented at right angles to those of the first grating 20, i.e. crossed with the first diffraction means. More broadly, "crossed" means that the direction of the second dispersion is normal to that of the first. The second grating 22 is preferably reflective as shown in the present example, and is used at low order with relatively low dispersing power, and its cross orientation separates the orders from the first grating 20 into a two-dimensional spectral pattern. "Low order" herein means equal to or less than about order 5 and is typically first order.

The radiation is reflected from grating 22 into a further dispersed beam 24. These rays are thence passed to a concave spherical reflector 26 which focuses the beam by way of an on-axis flat mirror 28 and a field flattener lens 30 onto a detector 34. Preferably the grating 22 is at the center of curvature 54 of the mirror 26 on its optical axis 56.

The detector 34 is sensitive to the impinging radiation, producing signals that are directed to the computer station 14 on line 35. The computer processes the signal information, corrects for background, applies calibration, and (in the present example) displays the results in the form of concentrations of atomic elements in the sample. The detector preferably is formed as a two dimensional array of small photodetectors 32, but alternatively may be a single photodetector that is positionable relative to the gratings. More preferably the detector is formed of a fixed solid state charge transfer device which effects signals proportional to the intensity of corresponding spectral lines impinging at various locations. Advantageously the detector is a charge coupled device (CCD) of the type disclosed in the aforementioned U.S. Pat. No. 4,820,048 incorporated herein by reference. The detector has photosensitive pixels thereon that are arranged at locations of selected spectral lines focussed thereto, with adjacent pixels used for detecting background radiation. The pixels are further located to detect radiation in several spectral ranges, for example two ranges covering visible and ultraviolet respectively. The computer addresses the device on line 36 to read out the detector signals.

The second grating 22 (FIG. 2) is a plural grating in that it has its surface divided into several portions. In the present case, two portions are separated by a boundary 37. The first portion 38 has a configuration of first grooves 40 for effecting the dispersed beam 24 in a first selected spectral range. The second portion 42 has a configuration of second grooves 44 for effecting the dispersed beam in a second selected spectral range different than the first spectral range but with the same beam direction. For example, the first portion 38 has a groove density of 375 grooves per millimeter and a low blaze angle such as 6° for the spectral range of 167 to 405 nanometers (nm) wavelength light which is in the ultraviolet range; and the second portion 42 has 187.5 grooves per centimeter and a similar low blaze angle such as 6° for the range 405 to 766 nm which is visible. To provide sufficient radiation the first, ultraviolet portion may be substantially larger than the second, visible portion, for example about ten times larger so that the second portion is only 10% of the total area. Spectra from the plural grating 22 in selected ranges are directed to the detector 34. With the computer 14 selected spectral lines from both ranges can be analyzed. However, it is possible for one range (particularly the visible range) to interfere with the other (ultraviolet) range.

Figure 2:
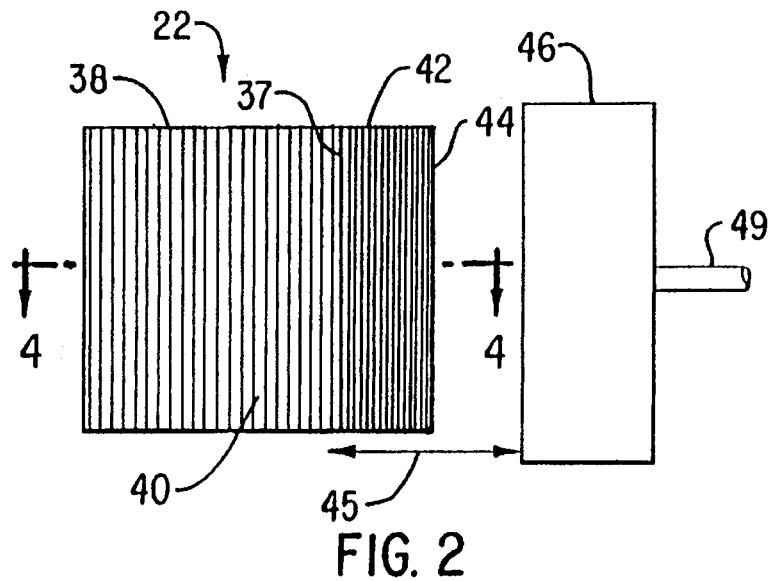
FIG. 2 is a view of the face of an embodiment for an optical grating component and an associated shutter in the system of FIG. 1.

Therefore, in preferred aspect, a movable shutter 46 (in a plane perpendicular to the plane of the FIG. 1) is disposed adjacent to the plural grating 22, so as to selectively block or expose the first portion 38 or the second portion 42 of the diffracting surface. Such a shutter may be moved so as to block either the first or the second portion. However, in the present embodiment, as the ultraviolet usually will not significantly interfere with the visible, it is only necessary for the shutter to be positionable to either block or expose the second portion of the grating surface. When the shutter is closed to block the second portion, preventing dispersion of the visible range to the detector, the ultraviolet radiation is dispersed and passed to the detector from the first portion of the grating. When the shutter is open (as shown in FIG. 2) to uncover the visible range, both ranges of the spectrum are passed through, but the ultraviolet lines generally should not interfere with the visible detection at the pixel locations for visible light on the detector. For the ultraviolet radiation, the closed shutter prevents spectral overlap which would occur from the visible.

In the foregoing embodiment, for exposing the second portion the shutter is positioned to additionally expose the first portion. Another embodiment (FIG. 3) a grating 22' has a configuration wherein the first portion 38' is substantially larger (e.g. 10 times larger) than the second portion 42' delineated by boundary 37', the groove configurations 40', 44' being unchanged. In such case, the shutter 46' has an area substantially the same as that of the second portion, and for exposing the second portion the shutter is moved over the first portion. As the shutter is relatively small compared with the second portion (10%), it will have little effect on the ultraviolet spectrum. This embodiment eliminates the need for extra space for the shutter in the second position.

Although the above embodiments provide for a simple shutter arrangement to accommodate the two ranges of visible and ultraviolet, the invention may be extended to other spectral ranges or to more than two ranges. The portions are formed and delineated on the second grating with suitable grating densities. The shutter is configured to selectively block and pass dispersed radiation from any desired portion or portions of the grating. It also will be appreciated that other arrangements of the surface portions may be utilized; for example, the second portion may constitute a central disk region on the surface, with a shutter disk movable laterally or swung away from the grating. The shutter or other blocking means need not be immediately adjacent to the grating, but should be close enough to achieve the blocking purpose.

If there is some interference in a spectrum from exposing both portions in one setting, a smaller spread of the spectrum that is not interfered with may be selected for analysis. If this is not desired, the shutter may be configured to selectively block all of each portion of the grating while exposing the other.

The shutter may be moved 45 for positioning by any known or other desired manner, for example with a solenoid 48 and a rod mount 49 as shown. Other potential positioning systems (not shown) include a stepper motor with a worm gear, or a hand lever with appropriate linkage; or the shutter may be a slotted disk, or part of a disk, mounted rotationally to a stepper motor. It is advantageous to control the setting via a signal line 44 from the computer, either automatically or by operator input. In such case, the programming 43 in the computer 14 is modified in a conventional manner to that of the main control of the spectrometer which may be, for example in "C" programming in software or firmware.

Computerized selection of an appropriate part of the spectrum may be effected from the detector signals in a programming of the computer 14. This should be synchronized with positioning of the shutter, the positioning of the solenoid 48 being controlled and/or detected via the line 44. If there is some spectral interference, e.g. overlapping the ultraviolet when both portions of the grating are exposed, only certain non-interfered spectral lines within the band may be selected by the computer program.

Figure 4:
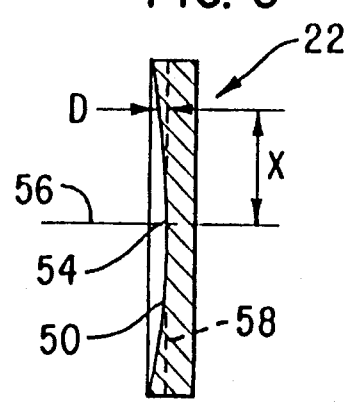
FIG. 4 is a cross section taken at 4—4 of FIG. 2.

In a further aspect (FIG. 4), the second grating is also configured to provide correction for aberrations in the focussing of the spectral image proximate the detector. In particular, the concave mirror 26 is conveniently spherical, which however introduces spherical aberration. In such case, the second grating 22 is formed as a Schmidt corrector with the grating surface having contours deviating from planar so as to compensate at least substantially for the aberration. Such correction is provided in the manner disclosed in the aforementioned U.S. Pat. No. 3,521,943, incorporated herein by reference.

Figure 3:
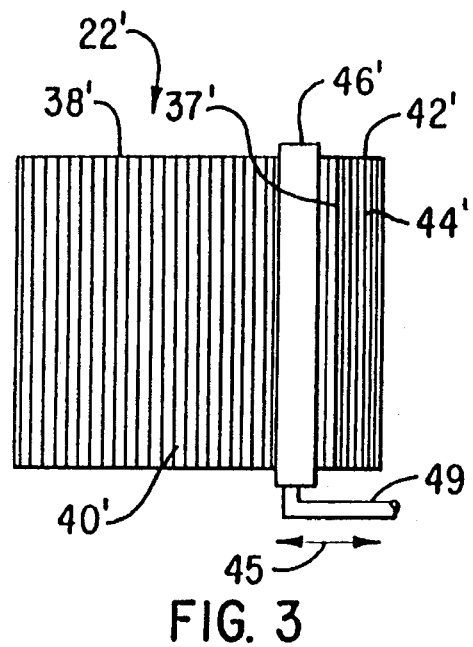
FIG. 3 is a view of the face of a further embodiment for an optical grating component and an associated shutter in the system of FIG. 1.

Broadly, the correction from planar is the same as the deviation of the spherical mirror from parabolic. With reference to FIG. 3, a convenient formula for deviation D of the grating surface envelope 50 from planar 58 is in the form $$D = KX^4 + LX^6 + MX^8 + NX^{10}$$

where the grating has a center of rotation on the optical axis at the center of curvature of the mirror, X is the radial distance in millimeters from the axis to a point where D is computed, and K, L, M and N are constants. The constants may be determined by series approximation, reiterations or the like from basic equations for the deviation of the mirror from parabolic, and may be refined empirically. For a mirror with a radius of 40 cm, suitable constants giving deviation D in millimeters vs X are:

$K = 1.675765 \times 10^{-9}$ $L = 1.413948 \times 10^{-14}$ $M = -8.364417 \times 10^{-19}$ $N = 9.628433 \times 10^{-23}$ Other optical components such as the first mirror may also introduce aberrations. In such case the second diffraction grating is shaped further to substantially compensate for those aberrations as well.

The gratings are formed by preparing grooves with conventional techniques, for example in an aluminum coating on a glass substrate that is planar or shaped for Schmidt correction. Replication methods can then be used for reproduction. Grooves on a curved surface may be formed in the known or desired way by holography or preferably by ruling the grating with parallel lines in the conventional manner.

While the invention has been described above in detail with reference to specific embodiments, various changes and modifications which fall within the spirit of the invention and scope of the appended claims will become apparent to those skilled in this art. Therefore, the invention is intended only to be limited by the appended claims or their equivalents.

What is claimed is:

1. An optical spectrometer for separate detection of different spectral ranges, comprising initial dispersion means receptive of source radiation to effect light radiation in the form of an initial spectrum, a plural dispersion grating receptive of the initial spectrum and being crossed with the initial dispersion means to effect a spectrally dispersed beam, and detector means comprising a two dimensional array of photodetectors receptive of the beam for spectral detection thereof, wherein the plural dispersion grating has a grating surface comprising a first surface portion and a second surface portion, the first portion having a first groove configuration for effecting the dispersed beam in a first spectral range, and the second portion having a second groove configuration for effecting the dispersed beam in a second spectral range different than the first spectral range.

2. The spectrometer of claim 1 wherein the initial dispersion means comprises an initial reflective dispersion grating, and the plural dispersion grating is reflective.

3. The spectrometer of claim 1 further comprising focussing means for focussing the dispersed beam to the detector means, wherein the focussing means introduces an inherent aberration into the focussing, and the grating surface is contoured to substantially compensate for the aberration.

4. The spectrometer of claim 1 further comprising selection means for selectively blocking the first portion or the second portion of the grating surface so as to select the first spectral range or the second spectral range for detection.

5. The spectrometer of claim 4 further comprising focussing means for focussing the dispersed beam to the detector means, wherein the focussing means introduces an inherent aberration into the focussing, and the grating surface is contoured to substantially compensate for the aberration.

6. The spectrometer of claim 4 wherein the selection means comprises a shutter disposed to selectively block or expose the first portion or the second portion of the grating surface.

7. The spectrometer of claim 4 wherein the detector means is configured to detect both the first spectral range and the second spectral range such that the second range can interfere with detection of the first range and the first range does not substantially interfere with detection of the second range, and the selection means comprises a shutter that is positionable to either block or expose the second portion of the grating surface while continually exposing the first portion, thereby selecting the first spectral range or the second spectral range for detection.

8. The spectrometer of claim 7 wherein the initial dispersion means comprises an initial dispersion grating, and the plural dispersion grating is reflective.

9. The spectrometer of claim 8 wherein the first groove configuration is such that the first spectral range is substantially ultraviolet, and the second groove configuration is such that the second spectral range is substantially visible.

10. The spectrometer of claim 9 further comprising focussing means for focussing the dispersed beam to the detector means, wherein the focussing means introduces an inherent aberration into the focussing of the dispersed beam, and the grating surface is contoured to substantially compensate for the aberration.

11. The spectrometer of claim 7 wherein the first portion is substantially larger than the second portion, the shutter has an area substantially the same as that of the second portion, and for exposing the second portion the shutter is positioned over the first portion.

12. The spectrometer of claim 4 wherein the first spectral range may interfere with certain spectral lines in the second range, the detector means is configured to effect signals representative of spectral lines in each spectral range, the selection means comprises a shutter that is positionable to either block or expose the second portion of the grating surface while continually exposing the first portion to thereby select the first spectral range or the second spectral range for detection, the spectrometer further comprises computer means receptive of the signals for analyzing selected spectral lines therefrom, the selected spectral lines in the second spectral range being such lines that do not have significant interference from the first spectral range.

13. The spectrometer of claim 1 wherein the detector means is configured to effect signals representative of spectral lines in each spectral range, and the spectrometer further comprises computer means receptive of the signals for analyzing selected spectral lines therefrom, the selected spectral lines being selected so as to be in the first spectral range or the second spectral range.

14. The spectrometer of claim 13 wherein the first spectral range may interfere with certain spectral lines in the second range, the selected spectral lines in the second spectral range being such lines that do not have significant interference from the first spectral range.

* * * * *